Jan. 17, 1967   J. J. LAIDIG   3,298,543
SILO UNLOADER WITH LOAD RESPONSIVE DRIVE CONTROL
Filed Dec. 10, 1964   2 Sheets-Sheet 1
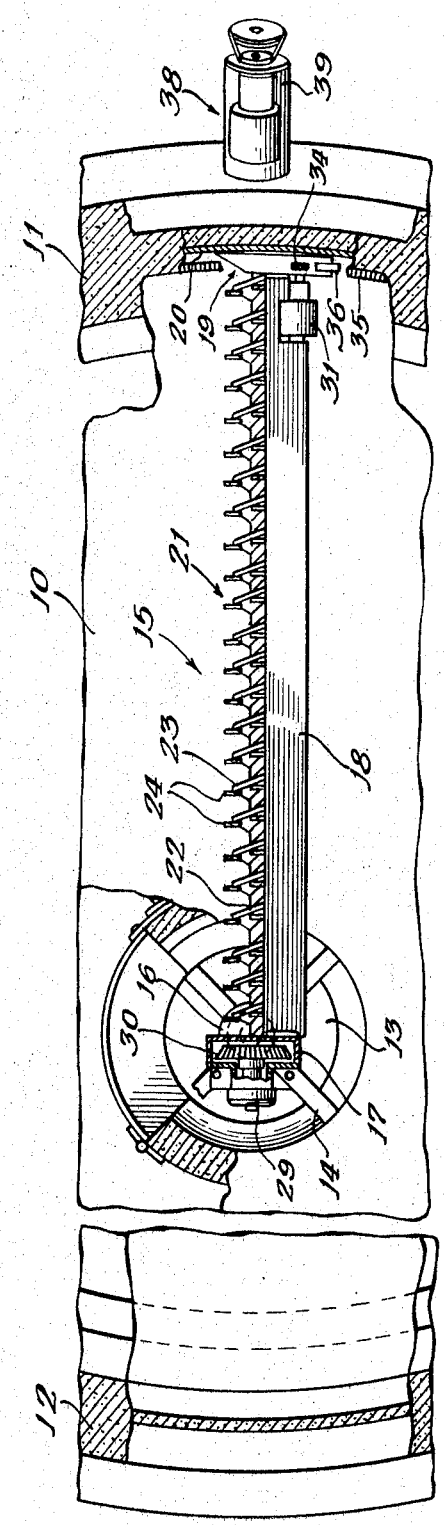
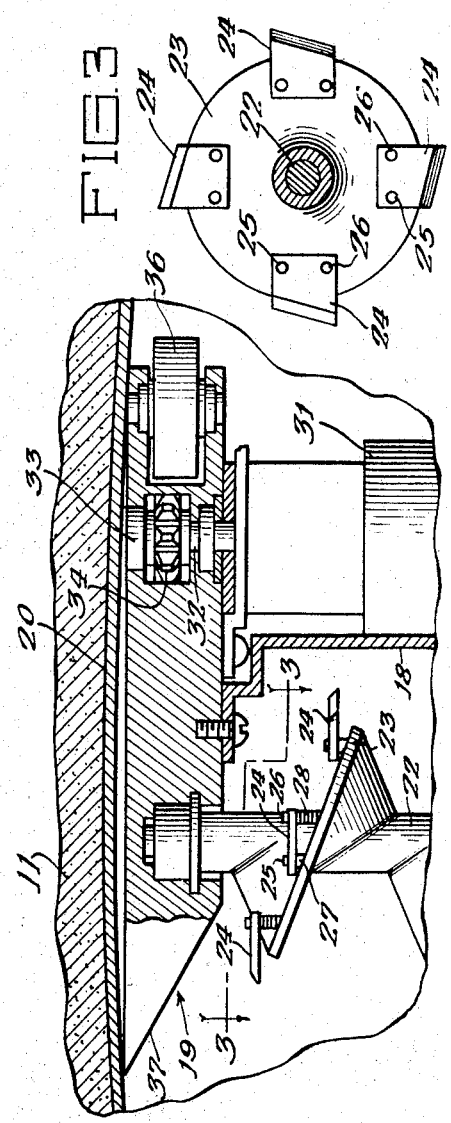
Inventor:
Jonathan J. Laidig
By: Hofgren, Wegner, Allen,
Stellman & McCord
Attorneys

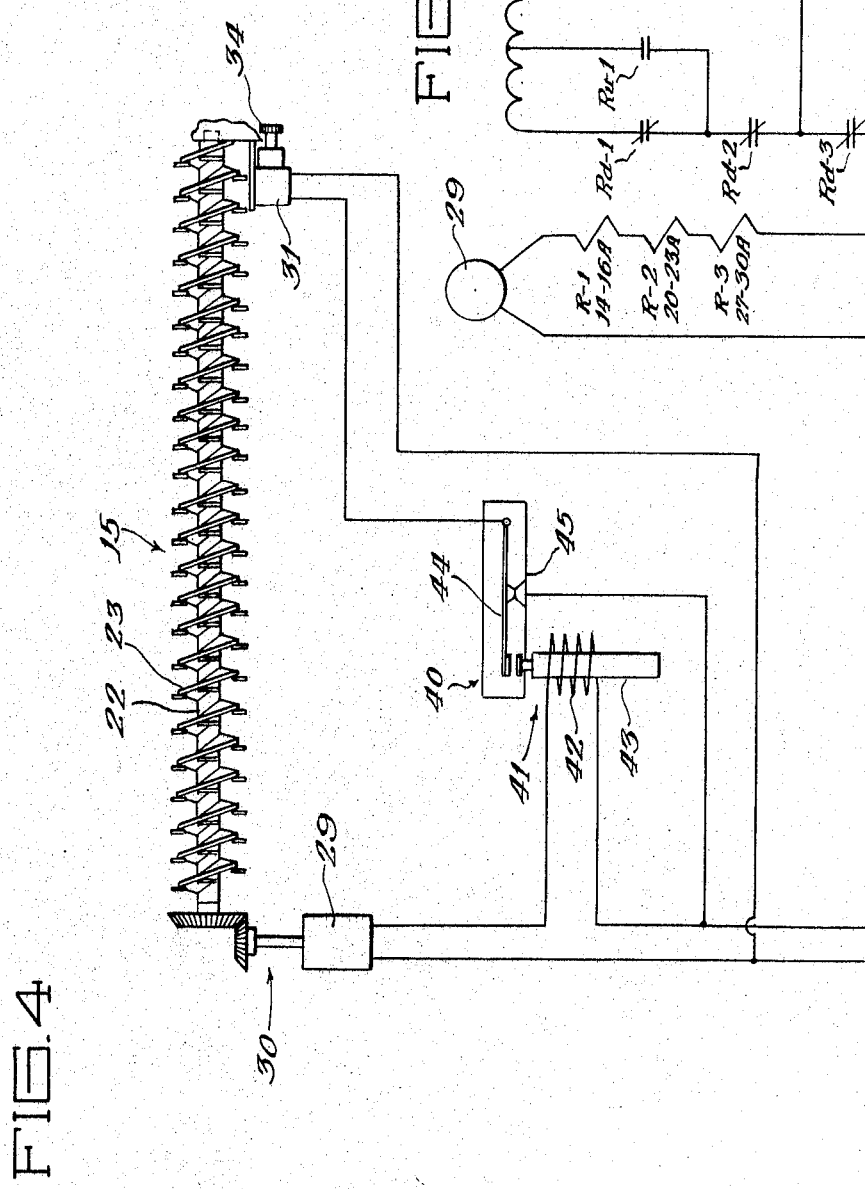

United States Patent Office

3,298,543
Patented Jan. 17, 1967

3,298,543
SILO UNLOADER WITH LOAD RESPONSIVE
DRIVE CONTROL
Jonathan J. Laidig, Mishawaka, Ind., assignor to Laidig
Silo Unloaders, Inc., a corporation of Delaware
Filed Dec. 10, 1964, Ser. No. 417,369
17 Claims. (Cl. 214—17)

This application relates to unloading mechanism for silos, and in particular it relates to such a mechanism which removes material from the bottom of the mass of silage stored in the silo.

Laidig Patent No. 3,121,501, issued February 18, 1964, reissued as Re. 25,863 on September 21, 1965, discloses and claims a silo unloading mechanism upon which the present mechanism is an improvement.

In accordance with the disclosure of Patent 3,121,501, a silo floor is provided with a central opening, and a radially disposed sweep arm is mounted for rotation about the axis of the silo. The sweep arm is provided with conveyor means in the form of an auger for moving silage radially inwardly toward the central opening where it may drop through to a discharge conveyor which carries it to the outside of the silo. The auger is provided with cutting blades which are mounted to project outwardly from the periphery of the helical auger flight, so that the knives may cut into the silage forward of and above the conveyor and thus loosen the silage for movement by the conveyor to the central opening. One motor is provided for driving the conveyor with its associated cutting knives, while a second motor mounted at the outer end of the sweep arm near the silo wall affords motive power for rotating the sweep arm around the silo.

As long as a device of the present type is operating the conveyor auger must be driven to keep delivering material to the central opening in the silo floor, and operation of the auger causes the knives to keep cutting material for delivery by the auger as long as the sweep arm is rotating about the silo. Accordingly, it is quite possible for the travel of the sweep arm and the operation of the knives to bring down more material than the auger can handle efficiently, thus causing the auger to operate more slowly and eventually stall if the overload is not relieved.

The present invention is directed to control means for the sweep arm drive which interrupts rotation of the sweep arm when load on the drive for the conveyor cutter exceeds a predetermined level, and automatically permits resumption of said rotation when the conveyor-cutter drive load drops below a predetermined level, which, with an electric motor, is preferably a few amperes below the level at which rotation is interrupted.

In one of two embodiments here disclosed, both drive motors are electric, and the drive control comprises a solenoid having a coil that is wired in series with the conveyor-cutter motor, and a plunger that moves in a predetermined direction only when current through the coil reaches a predetermined level. A normally closed switch in the electric circuit for the sweep arm motor is opened by movement of the plunger, stopping said motor and thus interrupting rotation of the sweep arm so as to stop the cutting of material and permit the continuing operation of the auger to eliminate the overload. Reduction in load on the auger drive motor reduces the current through the solenoid coil, and when the current drops to a low enough level the plunger returns to its normal position, permitting the switch to close and resume operation of the sweep arm drive motor. The solenoid plunger may be gravity urged to its normal position, or may be spring urged. In either case, the level of current at which the plunger moves may be adjusted in any of the known ways, as by changing the spring tension, or providing the plunger with an adjustable counterweight in the case of a gravity urged plunger.

In a second embodiment, the sweep arm motor is a field coil multi-speed motor, and three magnetic relays are placed in the control circuit with taps at different points on the motor field coil, so the sweep arm may rotate at three different speeds, or stop, depending on the load on the auger motor.

In either arrangement, the solenoid or solenoids are adjusted so that starting load on the auger motor surges the current above the level at which the sweep arm motor can operate, thus preventing movement of the sweep arm until after the starting load on the auger has subsided and any excess material left in the auger from the last preceding operation has been disposed of. Thus, the control acts as an automatic sequence switch that prevents any cutting load to be put on the auger motor until the starting load has subsided.

Certain types of material, such as shelled corn, do not require cutting; but nevertheless the auger may overload due to bridging and slumping of the material, so even where there are no knives the present drive control is very advantageous.

The mechanism is illustrated in a preferred and an alternative embodiment in the accompanying drawings in which:

FIG. 1 is a fragmentary horizontal sectional view through a silo which is equipped with the improved mechanism of the present invention, parts of said drawing being broken away for clarity of illustration.

FIG. 2 is a fragmentary section on an enlarged scale at the outer extremity of the sweep arm, showing the auger and knives in plan view;

FIG. 3 is a section taken substantially as indicated along the line 3—3 of FIG. 2;

FIG. 4 is a diagrammatic view of one embodiment of an electric control circuit for the second drive motor; and FIG. 5 is a diagrammatic view of a second embodiment of an electric control circuit for the second drive motor.

Referring to the drawings in greater detail, a silo has a floor 10, the periphery of which is supported on a cylindrical foundation wall 11 from which a cylindrical silo wall 12 extends upwardly. An axial opening 13 in the floor of the silo is provided with a spider 14 upon which a sweep arm, indicated generally at 15, is mounted for rotation by means of a bearing head 16.

Surmounting the bearing head 16 is a housing 17 to which the inner end of an arcuate shield 18 is secured. The outer end of the shield 18 is secured to a drive plow, indicated generally at 19, which is illustrated as riding in a channel member 20 which is recessed in the silo wall 12, but which may, if desired, be positioned wholly inside the silo wall so as to ride on the floor 10. A helical auger conveyor, indicated generally at 21, includes a shaft 22 which has its inner and outer ends journaled, respectively, in the housing 17 and the drive plow 19, and a helical auger flight 23 on the shaft is provided with peripherally mounted knives 24 that provide cutting means. As best seen in FIG. 2, each of the knives 24 is mounted upon the auger flight 23 by means of a short stud 25 and a long stud 26 carrying spacer sleeves 27 and 28, respectively, there being retaining nuts screwed onto the projecting outer ends of the studs to clamp the knives 24 against the spacers. The spacers are so related that each knife is substantially tangent to an imaginary cylinder that is concentric with the cylindrical silo wall 12 and each knife is also in a plane normal to the auger shaft 22.

Drive means for the conveyor 21 includes a first electric motor 29 that is supported on the spider 14 and is drivingly connected with the auger shaft 22 by gear means 30 (see FIG. 4) part of which is journaled in the bearing head 16 and part of which is in the housing 17.

The sweep arm 15 has an electric motor 31 near its outer end that has an output shaft 32 journaled in a bearing 33 in the drive plow 19, and a pinion 34 in the form of a sprocket makes positive driving engagement with a rack 35 which takes the form of a roller chain fixedly mounted in the upper web of the channel member 20. A supporting wheel 36 is journaled in the rear of the drive plow to support the plow, and the front end of the plow is provided with a surface 37 which is diagonal to the wall 12 so as to move silage inwardly toward the sweep auger 21. The motor 29 and gears 30 provide first drive means for driving the conveyor auger 21 with its associated cutting blades 24, while the motor 31 and sprocket 34 provides second drive means for rotating the sweep arm 15 about the silo.

Silage moved to the central opening 13 by the auger conveyor 21 drops into the inner end (not shown) of separate discharge auger means, indicated generally at 38, the outer end 39 of which extends through the silo foundation 11 so as to discharge material outside the silo. Conveniently, the conveyor 38 is also a helical type conveyor.

As the sweep arm is rotated about the silo and the conveyor auger is driven, the cutting means afforded by the knives 24 cuts grooves in the silage forward of and above the helix, and because of the heretofore described mounting of the knives 24 they exert substantially no radial pressure upon the silage as they cut the grooves in it. The arrangement of the knives described is disclosed and claimed in my copending application Serial No. 403,558, filed October 13, 1964.

Referring now to FIG. 4, the first embodiment of a load responsive control for the motor 31 includes solenoid switch means, indicated generally at 40, having a solenoid 41 with a coil 42 wired in series with the first drive motor 29, and a plunger 43. As illustrated, the plunger is urged by gravity toward a normal position, and when load on the motor 29 reaches a predetermined level the current through the coil 42 moves the plunger 43 upwardly into contact with an arm 44 of a normally closed switch 45 so as to open the circuit to the motor 31 and suspend drive of said motor until the load on the auger motor is again below said predetermined level. When this occurs, the drive motor 31 resumes rotating the sweep arm.

Switches of a type suitable for the present control are commercially available from Square D under the designation of Magnetic Current Relays. Another device that is suitable for the present purpose is Cutler-Hammer's A.-C. Load Current Relay.

FIG. 5 illustrates the second embodiment of a drive control, with a three speed control for motor 31 of FIG. 4. Three magnetic current relays R-1, R-2, and R-3 are placed in series with one of the lines L-1 which energize auger motor 29. A field winding 31' of sweep motor 31 is connected to line L-1 through the relay contacts illustrated. Normally open contact $R_{u-1}$ of relay R-1 shunts approximately one-third of winding 31', while normally open contact $R_{u-2}$ of relay R-2 shunts approximately two-thirds of field winding 31'. The other end of winding 31' is connected to line L-2.

The three relays will each be energized by a different value of current flowing through line L-1. For example, relay R-1 may be energized at 10 amperes and thereafter deenergized at 9 amperes, relay R-2 may be energized at 20 amperes and deenergized at 18 amperes, while relay R-3 may be energized at 30 amperes and deenergized at 27 amperes. Magnetic current relays actuable at different current levels are common in the art and per se form no part of the present invention. Such relays often consist of a wire wound coil, through which the load current flows, and a movable plunger assembly within the coil. Current flowing in the coil exerts a magnetic pull on the plunger, tending to lift it. When this pull exceeds the force of gravity, the plunger rises to strike an electrical contact, which in turn operates the contacts illustrated. The plunger may be screwed up or down on a stem, thereby changing the current level necessary to energize the relay.

During the normal or fast speed of operation of sweep motor 31, current is fed through the three normally closed relay contacts $R_{d-3}$, $R_{d-2}$, and $R_{d-1}$, to field winding 31'. As auger motor 29 operates more slowly, due to overload, the current flowing in line L-1 will increase. When this current increases to the level necessary to energize relay R-1, the normally open contact $R_{u-1}$ will close while the normally closed contact $R_{d-1}$ will open. As a result, only two-thirds of field winding 31' will be connected to the energizing lines L-1 and L-2. This will cause sweep motor 31 to operate at a slower speed while relay R-1 remains energized. If the load on motor 29 is thereafter removed, the current in line L-1 will drop below the value necessary to energize relay R-1, causing sweep motor 31 to return to its normal speed.

If the sweep motor 31 continues to bring down more material than the auger can handle efficiently, the current in line L-1 will continue to increase until it reaches a level necessary to trip relay R-2. This will cause the normally closed contact $R_{d-2}$ to open and the normally open contact $R_{u-2}$ to close, thereby connecting only one-third of field winding 31' to the energizing source. Thus, sweep motor 31 will assume a second speed slower than the speed of operation when relay R-1 is energized.

If sweep motor 31 continues to bring more material, which would cause the auger to stall, the current in line L-1 will rise to a level sufficient to trip relay R-3, thereby opening normally closed contact $R_{d-3}$. This, in turn, will disconnect field winding 31' from the source of power L-1 and L-2, causing motor 31 to stop. After auger motor 29 has cut away the necessary silage, the current in line L-1 will decrease, allowing sweep motor 31 to increase its speed until its normal speed is reached.

It will of course be realized that the relay contacts connecting one side of the energizing source to the field winding 31' can have alternate equivalent connections. For example, the normally closed contacts $R_{d-1}$ and $R_{d-2}$ could be eliminated, if desired. Thus, when relay R-1 is energized, normally open contact $R_{u-1}$ will close, shunting out one-third of field winding 31', causing the same portion of field winding 31' to be connected to lines L-1 and L-2 as was previously connected when contact $R_{d-1}$ was present. Other alternate connections are similarly possible.

The foregoing detailed description is given for clearness of understanding only and no unnecessary limitations should be understood therefrom, as modifications will be obvious to those skilled in the art.

I claim:

1. In a silo having a floor with an axial opening and having an upright cylindrical wall, unloader means comprising: a radial sweep arm adjacent the floor; means mounting said arm for rotation about the axis of the silo; silage gathering and feeding means on said arm for loosening silage and moving it toward said opening; first drive means including a first motor for driving said gathering and feeding means; second drive means including a second motor from which said second drive means normally receives an effectively uniform flow of power, and said second drive means being constructed and arranged to apply a substantially constant driving force to the sweep arm and thus rotate the sweep arm about the silo with an effectively uniform forward motion to bring said gathering and feeding means into contact with silage stored in the silo; and means for controlling rotation of the sweep arm about the silo in response to changes in the torque load on the first motor, said controlling means including at least one control element which functions automatically and effectively instantaneously at a predetermined high level of load on the first motor resulting from the presence of an excessive quantity of silage in the gathering and feeding means to sharply reduce the driving force on the sweep arm and thereby change the rate of rotation of the sweep arm from a relatively high rate at which the gathering means is moved into engagement with the silage to a minimum rate at which gathering of silage is effectively terminated while permitting the feeding means to continue to operate and dispose of sufficient silage to reduce the torque load on the first motor below said high level so that normal rotation of the sweep arm may be resumed.

2. The unloader means of claim 1 in which the load responsive control means includes a plurality of control elements which function at different levels of load on the first motor and control the rotation of the sweep arm in a series of steps, said rotation being at a maximum rate when load on the first motor is below a predetermined low level and being at a minimum rate when load on said first motor exceeds said high level.

3. The unloader means of claim 2 in which the minimum rate is zero.

4. The unloader means of claim 1 in which the control elements control the energization of the second motor.

5. The unloader means of claim 1 in which the load responsive control means includes a single control element which functions to control rotation of the sweep arm between a maximum rate which exists at all loads on the first motor below a predetermined high level, and a minimum rate at all loads on said first motor above a predetermined high level.

6. The unloader means of claim 5 in which the minimum rate of rotation of the sweep arm is zero.

7. The unloader means of claim 5 in which the single control element controls the energization of the second motor to cause said motor to selectively produce a maximum rate of rotation of the sweep arm or a minimum rate of rotation of said arm.

8. The unloader means of claim 7 in which the minimum rate of rotation of the sweep arm is zero.

9. The unloader means of claim 1 in which the gathering and feeding means includes knives for cutting the silage.

10. In a silo having a floor with an axial opening and having an upright cylindrical wall, unloader means comprising: a radial sweep arm adjacent the floor; means mounting said arm for rotation about the axis of the silo; silage gathering and feeding means on said arm for loosening silage and moving it toward said opening; drive means including a motor for driving said gathering and feeding means; means to normally apply a substantially constant driving force to the sweep arm and thus rotate the sweep arm about the silo with an effectively uniform forward motion to bring said cutting and feeding means into contact with silage stored in the silo; and means for controlling rotation of the sweep arm about the silo in response to changes in the torque load on said motor, said controlling means including at least one control element which functions automatically and effectively instantaneously at a predetermined high level of load on the motor resulting from the presence of an excessive quantity of silage in the gathering and feeding means to sharply reduce the driving force on the sweep arm and thereby change the rate of rotation of the sweep arm from a relatively high rate at which the gathering means is moved into effective gathering engagement with the silage to a minimum rate at which gathering of silage is effectively terminated while permitting the feeding means to continue to operate and dispose of sufficient silage to reduce the torque load below said high level so that normal rotation of the sweep arm may be resumed.

11. The unloader means of claim 10 in which the controlling means interrupts rotation of the sweep arm at said high level of load on said motor.

12. The unloader means of claim 10 in which the controlling means includes a plurality of control elements with function at different levels of load in the first motor to control the rotation of the sweep arm in a series of steps, said rotation being at a maximum rate when load on the motor is below a predetermined low level and being at a minimum rate when load on the motor exceeds said high level.

13. The unloader means of claim 10 in which the minimum rate of rotation is zero.

14. The unloader means of claim 10 in which the gathering and feeding means includes knives for cutting the silage.

15. In a silo having a floor with an axial opening and having an upright cylindrical wall, unloader means comprising: a radial sweep arm adjacent the floor; means mounting said arm for rotation about the axis of the silo; silage gathering and feeding means on said arm for loosening silage and moving it toward said opening; first drive means for driving said gathering and feeding means; second drive means separate from said first drive means to normally apply a substantially constant driving force to the sweep arm and thus rotate the sweep arm about the silo with an effectively uniform forward motion to bring said gathering and feeding means into contact with silage stored in the silo; and load responsive control means for automatically and effectively instantaneously interrupting the rotation of the sweep arm by the second drive means whenever the torque load on the first drive means exceeds a predetermined level because of the presence of an excessive quantity of silage in the gathering and feeding means to sharply reduce the driving force on the sweep arm, and automatically resuming said rotation when the feeding means has disposed of enough of said silage therein to drop said load below a predetermined level.

16. The unloader means of claim 15 in which the first drive means includes a first motor and the second drive means includes a second motor, and the load responsive control means includes a plurality of control elements that operate at different levels of load on the first motor below a maximum level at which application of driving force to the sweep arm is stopped by interrupting the supply of power to the second motor, each said element functioning to reduce application of force by reducing power to the second motor at a particular level of load on the first motor.

17. The unloader means of claim 15 in which the level of torque load at which rotation of the sweep arm by the second motor is interrupted is substantially below the starting torque load of the first motor, whereby the second motor may start only after the starting torque load on the first motor has subsided.

References Cited by the Examiner

UNITED STATES PATENTS

| | | | |
|---|---|---|---|
| 2,635,770 | 4/1953 | Tiedemann | 241—17 |
| 2,675,931 | 4/1954 | Makous | 214—17 |
| 2,934,224 | 4/1960 | Puckett | 214—17 |
| 3,121,501 | 2/1964 | Laidig | 214—17 |
| 3,237,788 | 3/1966 | Weaver et al. | 214—17 |

GERALD M. FORLENZA, *Primary Examiner.*

ROBERT G. SHERIDAN, *Examiner.*